United States Patent
Kesler et al.

(10) Patent No.: US 10,163,078 B2
(45) Date of Patent: Dec. 25, 2018

(54) AIRCRAFT NON-PERIODIC MAINTENANCE SCHEDULING SYSTEM

(71) Applicant: The Boeing Company, Chicago, IL (US)

(72) Inventors: Paul A. Kesler, Arlington, VA (US); Bob Kalinowski, St. Charles, MO (US); Kevin M. Arrow, St. Chares, MO (US); William E. Wojczyk, Jr., O'Fallon, MO (US); Dan L. Hagrman, Creve Coeur, MO (US); Scott R. Greene, Defiance, MO (US)

(73) Assignee: The Boeing Company, Chicago, IL (US)

( * ) Notice: Subject to any disclaimer, the term of this patent is extended or adjusted under 35 U.S.C. 154(b) by 36 days.

(21) Appl. No.: 15/198,601

(22) Filed: Jun. 30, 2016

(65) Prior Publication Data

US 2018/0005197 A1    Jan. 4, 2018

(51) Int. Cl.
| | |
|---|---|
| *G01M 17/00* | (2006.01) |
| *G06F 7/00* | (2006.01) |
| *G06F 19/00* | (2018.01) |
| *G06Q 10/00* | (2012.01) |
| *B64F 5/00* | (2017.01) |
| *G06Q 10/10* | (2012.01) |
| *G07C 5/00* | (2006.01) |
| *G07C 5/08* | (2006.01) |
| *G08G 5/00* | (2006.01) |

(52) U.S. Cl.
CPC .......... *G06Q 10/20* (2013.01); *B64F 5/0081* (2013.01); *G06Q 10/1097* (2013.01); *G07C 5/006* (2013.01); *G07C 5/0808* (2013.01); *G08G 5/0004* (2013.01)

(58) Field of Classification Search
CPC .. G06Q 10/20; G06Q 10/1097; B64F 5/0081; G07C 5/006; G07C 5/0808; G08G 5/0004
USPC ........................................................ 701/31.6
See application file for complete search history.

(56) References Cited

U.S. PATENT DOCUMENTS

| | | | |
|---|---|---|---|
| 4,943,919 | A | 7/1990 | Aslin et al. |
| 6,789,007 | B2 | 9/2004 | Ellis et al. |
| 7,188,051 | B2 | 3/2007 | Millette et al. |
| 7,433,789 | B1 | 10/2008 | Balestra |
| 7,548,802 | B2 | 6/2009 | Avery et al. |
| 7,580,847 | B2 | 8/2009 | Black et al. |
| 7,636,568 | B2 | 12/2009 | Gould et al. |
| 7,689,329 | B2 | 3/2010 | Avery et al. |
| 7,761,200 | B2 | 7/2010 | Avery et al. |
| 7,761,201 | B2 | 7/2010 | Avery et al. |
| 7,840,376 | B2 | 11/2010 | Torng |

(Continued)

OTHER PUBLICATIONS

Search Report for related European Application No. EP17177636.2; report dated Sep. 25, 2017.

*Primary Examiner* — Harry Y Oh
(74) *Attorney, Agent, or Firm* — Miller, Matthias & Hull LLP

(57) ABSTRACT

A system aggregates data related to a non-conformance system in an aircraft and allocates resources to repairing the non-conformance condition. The system includes a service bus that receives and distributes the non-conformance condition and an optimizer tool that generates repair alternatives. The optimizer tool allows dynamic reconfiguration of rules to activate and deactivate or change a weight of individual rules in a rule set.

20 Claims, 9 Drawing Sheets

(56) References Cited

U.S. PATENT DOCUMENTS

| | | |
|---|---|---|
| 7,945,427 B2 | 5/2011 | Guenther et al. |
| 8,019,504 B2 | 9/2011 | Jamrosz et al. |
| 8,117,007 B2 | 2/2012 | Yitbarek et al. |
| 8,165,968 B2 | 4/2012 | Ramesh et al. |
| 8,212,673 B1 | 7/2012 | Whittaker |
| 8,255,112 B2 | 8/2012 | Conzachi et al. |
| 8,296,197 B2 | 10/2012 | Avery et al. |
| 8,296,252 B2 * | 10/2012 | Bernard .............. G05B 23/0283 706/46 |
| 8,340,854 B2 | 12/2012 | Doulatshahi et al. |
| 8,340,996 B2 | 12/2012 | Black et al. |
| 8,356,244 B2 | 1/2013 | Vandermolen et al. |
| 8,401,726 B2 | 3/2013 | Bouvier et al. |
| 8,437,906 B2 | 5/2013 | Yukawa et al. |
| 8,452,475 B1 | 5/2013 | West et al. |
| 8,571,747 B2 | 10/2013 | Zimpfer et al. |
| 8,583,468 B2 | 11/2013 | Black et al. |
| 8,630,819 B2 | 1/2014 | English et al. |
| 8,694,196 B1 | 4/2014 | Doulatshahi et al. |
| 8,812,154 B2 | 8/2014 | Vian et al. |
| 8,825,276 B2 | 9/2014 | Lake et al. |
| 8,856,134 B2 | 10/2014 | Hadley et al. |
| 9,037,320 B1 | 5/2015 | Kesler et al. |
| 2003/0191563 A1 * | 10/2003 | Eagleton ............. G05B 23/0229 701/33.4 |
| 2004/0199307 A1 * | 10/2004 | Kipersztok ............... B64F 5/60 701/32.9 |
| 2007/0124189 A1 | 5/2007 | Stoughton et al. |
| 2007/0219676 A1 * | 9/2007 | Allen .................... G01C 23/00 701/3 |
| 2008/0010107 A1 | 1/2008 | Small et al. |
| 2009/0240468 A1 * | 9/2009 | Torng .................... G06Q 10/06 702/181 |
| 2009/0240517 A1 * | 9/2009 | Pelter ................ G06Q 30/0278 705/306 |
| 2009/0265393 A1 * | 10/2009 | Yukawa ............ G06F 17/30575 |
| 2010/0049379 A1 * | 2/2010 | Vial .................... G07C 5/0808 701/3 |
| 2014/0316743 A1 | 10/2014 | Drees et al. |
| 2014/0361074 A1 * | 12/2014 | Kumar ............. G06F 17/30011 235/376 |

\* cited by examiner

| Rules | | Soft | Hard |
|---|---|---|---|
| 302 ☐ Fault isolation tasks should be performed overnight | | | |
| 303 Min. Turntime (mins) 360 | | 0 | -1 |
| 304 ☐ Replace-repair tasks should be performed overnight | | | |
| Min. Turntime (mins) 360 | | -3 | 0 |
| 305 ☒ Required part number in FIM is not known to the parts database | | 0 | -1 |
| 306 ☒ Required parts must be at location if turntime slot is before 24 hours | | 0 | -1 |
| 307 ☒ Required part can be shipped to overnight location | | -3 | 0 |
| 308 ☒ Maintenance should be performed as soon as possible (penalty) | | -1 | 0 |
| 309 ☒ Maintenance tasks must be done in order | | 0 | -1 |
| ××× | | | |
| 310 ☒ Maintenance must be performed at Level 3 or better station | | 0 | -1 |

AIRCRAFT NON-PERIODIC MAINTENANCE SCHEDULING SYSTEM

FIELD

This disclosure relates generally to aircraft non-periodic maintenance scheduling and more particularly to a system that evaluates maintenance risk and directs aircraft maintenance activity for component fault events that occur either outside of the schedule for routine, time-phased part replacement or the scheduled inspections and their associated repair actions.

BACKGROUND

Aircraft are the lifeblood of an airline or any business that relies on such aircraft for timely movement of people and material between cities. An aircraft on the ground, especially for service or other maintenance, cannot generate revenue. The goal is to keep aircraft in an airworthy condition so that they are available for use as needed.

When an event such as a fault code or a prognostic alert, that is, any non-conformance condition occurs a decision must be made as to when and where to perform the service required. Optimizing the various factors of route, repair locations, parts availability, etc. to arrive at an optimal solution is a challenging problem.

SUMMARY

In an aspect of the disclosure, a system for aircraft maintenance scheduling includes a field interface coupled to a processor with a memory and configured to receive via a network interface an error report from an electronic non-conformance repository in communication with the processor, the error report containing information for a non-conformance condition in an aircraft. The system also includes a vendor interface coupled to the processor with the memory and configured to receive aircraft-specific fault information and maintenance information related to the non-conformance condition in the aircraft as well as a service bridge coupled to the processor with the memory and configured to receive from an operator of the aircraft, a flight schedule for the aircraft, one or more repair locations and their respective repair capabilities, and an inventory of parts for each of the one or more repair locations. The system additionally includes an auxiliary interface coupled to the processor with the memory and configured to receive weather data from at least one weather service for locations corresponding to the flight schedule and for the one or more repair locations. The system includes a memory and a processor. The memory stores at least one rule set, where a rule set includes a plurality of individual rules for processing the aircraft-specific fault information, the maintenance information, the flight schedule, the one or more repair locations and their respective repair capabilities, the inventory of parts, and the weather data, the rule set configured per operator criteria. The processor is coupled to the field interface, the vendor interface, the operator interface, the auxiliary interface, and the memory. The processor is configured to execute the rule set to determine i) whether correcting the non-conformance condition can be deferred, and when deferrable, ii) a course of action for correcting the non-conformance condition. The system also includes a display that is coupled to the processor and that presents the course of action for directing the aircraft to be present at a location and a time specified in the course of action for correcting the non-conformance condition.

In another aspect of the disclosure, a system that aggregates data related to a non-conformance condition in an aircraft and allocates resources to repairing the non-conformance condition includes a service bus that receives and distributes the data related to the non-conformance condition and a data application service coupled to the service bus that stores and retrieves deferred risk data and technical data for the aircraft, the application service supplying the deferred risk and technical data responsive to a request received via the service bus. The system also includes a service adapter that couples the service bus to an operator business application service, the service adapter configured to receive operator data from an operator, the operator data including route plans and an inventory of parts. The system further includes an optimizer tool coupled to the service bus. The optimizer tool itself includes a pre-processor that formats data received via the service bus and an optimizer that generates repair alternatives using a rule set, wherein the rule set is configurable during operation of the optimizer tool.

In yet another aspect of the disclosure, a method of determining a maintenance response to a non-conformance condition in an aircraft includes receiving, via a field interface coupled to a processor with a memory, the non-conformance condition in the aircraft. The method continues with requesting and receiving, via a vendor interface coupled to the processor and the memory, fault and maintenance information including a risk of further failure, corresponding to the non-conformance condition specific to the aircraft. The method includes receiving from an operator of the aircraft, via an operator interface coupled to the processor and the memory, a flight schedule for the aircraft, one or more repair locations, and an inventory of parts relevant to the non-conformance condition. A simplicity, ambiguity and volatility (SAV) rating is generated for the non-conformance condition by comparing historical repair records for the non-conformance condition to a repair process for the non-conformance condition, wherein the SAV rating contains a simplicity value, an ambiguity value, and a volatility value for resolving the non-conformance condition. The method concludes by evaluating, using a rule set stored in the memory executed on the processor, the fault and maintenance information, the risk of further failure, the flight schedule for the aircraft, the one or more repair locations and the SAV rating for the non-conformance condition to produce a location and time for the aircraft to have the non-conformance condition resolved.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

For a more complete understanding of the disclosed methods and apparatuses, reference should be made to the embodiment illustrated in greater detail on the accompanying drawings, wherein:

FIG. 8 is an illustration customizing a rule set for the aircraft maintenance scheduling system.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
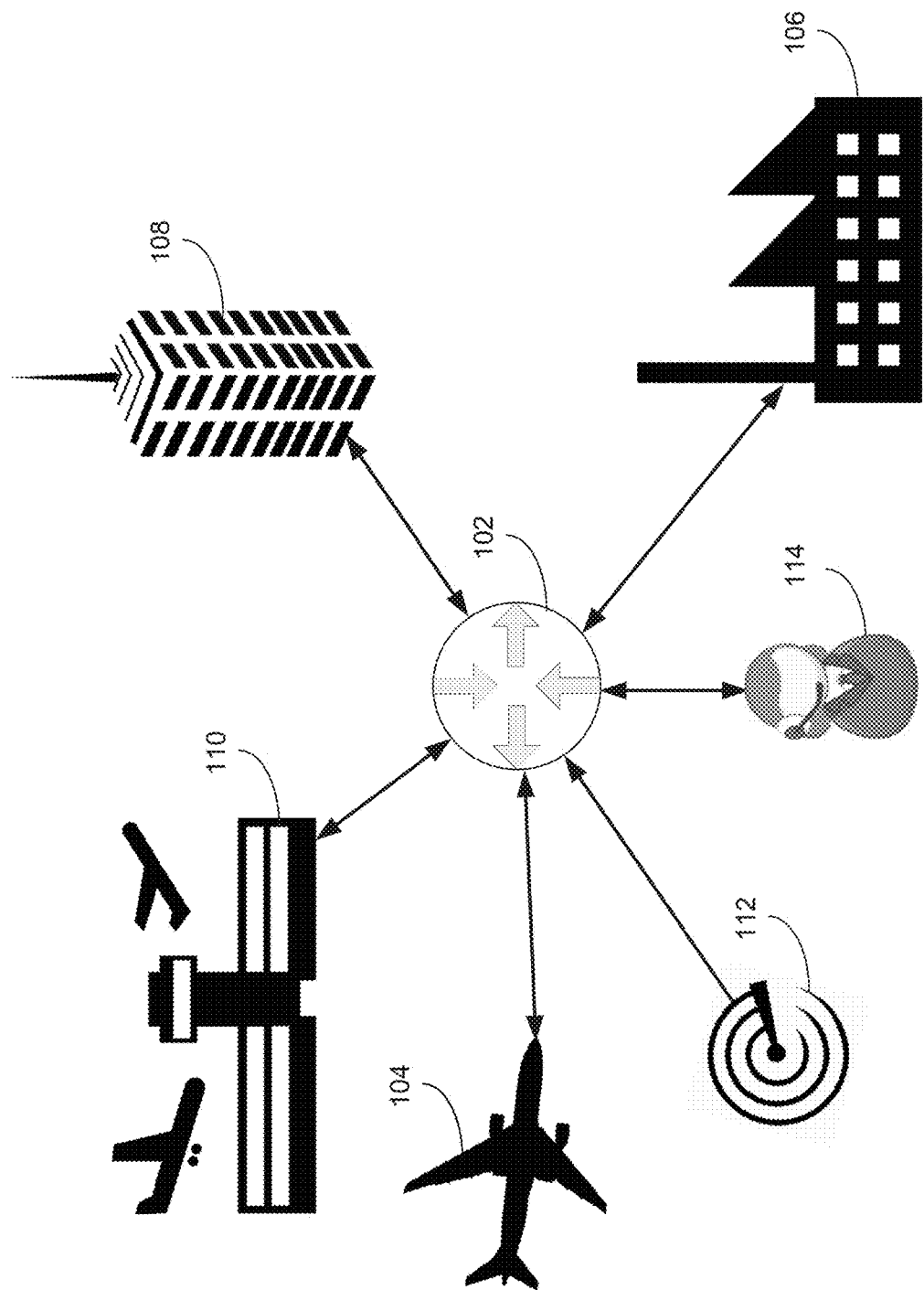
FIG. 1 is a block diagram of an aircraft environment in accordance with the current disclosure.

FIG. 1 illustrates elements of a system 102 for aircraft maintenance scheduling. An aircraft 104 generates an event, which is transmitted to the system 102 for analysis. The event may be reported automatically, for example, using the Aircraft Communications Addressing and Reporting System (ACARS). In other situations, the event may be reported by a pilot, mechanic or other ground personnel, or automatically generated based on previous maintenance history.

The event may be any of a number of conditions, from simple reports such as a reading light failure to critical engine component conditions that may represent a present danger. In between the simple and the critical are thousands of conditions that fall between the two. Each of these events must be evaluated and dispatched for maintenance by qualified maintenance personnel. For the purpose of this disclosure, the terms 'service' and 'maintenance' may be used interchangeably. In many cases, the maintenance may be deferred until the aircraft is at a convenient layover point with the necessary parts and qualified technicians. In other cases, the event may require that the aircraft be diverted to a repair facility or even grounded pending the repair.

Responsive to the event being reported to the system 102 data is received from a number of sources including aircraft's manufacturer 106, an operator 108, one or more airports 110, and weather sources 112. In an embodiment, a dispatcher 114 supervises operation of the system 102.

As will be discussed in more detail below with respect to FIG. 3, the manufacturer 106 provides information about the aircraft including service procedures and risk information and the operator 108 provides information about flight routes service capabilities at various airports 110. The weather information 112 is used to determine if the weather along the current flight route of the aircraft 104 will affect selection of possible repair locations.

Figure 2:
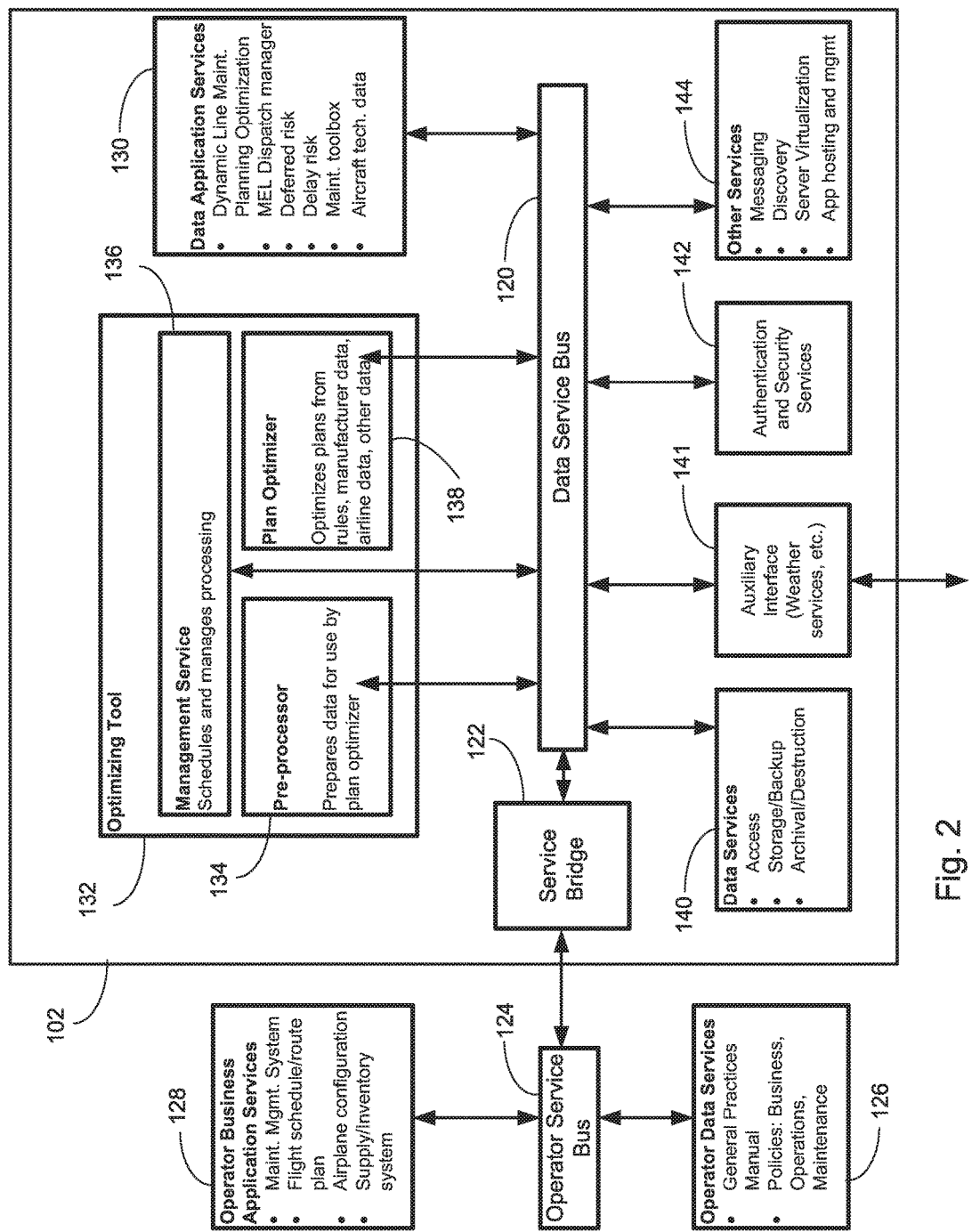
FIG. 2 is block diagram of a service architecture for an aircraft maintenance scheduling system in accordance with the current disclosure.

FIG. 2 is a block diagram illustrating an exemplary services architecture view of the system 102. A functional view of the system 102 is presented below with respect to FIG. 9. Individual elements of the system 102 are connected by a data service bus 120 that provides data connectivity and traffic management between various system components. A service bridge 122 provides various standard and customized adapters to allow connectivity between data service bus 120 and various outside entities. The service bridge 122 may also use integration adapters with predetermined protocols for use in building interfaces to various data providers and particularly to airlines or other air carriers. In this exemplary embodiment, connection to an operator service bus 124 allows information transfer from all operator business application services 128 and operator data services 126.

Operator business application services 128, in this embodiment, include the operator's maintenance management system, flight schedules, aircraft configurations, as well as spare parts inventory availability. Operator data services include, but are not limited to, general operating practices and policies for business, operations, and maintenance.

Returning to the system 102, a data application service component 130 is a subsystem that provides maintenance planning optimizations, minimum equipment list (MEL) information (discussed below), both deferred risk and delayed risk associated with a particular event, as well as aircraft technical data, among others.

Figure 4:
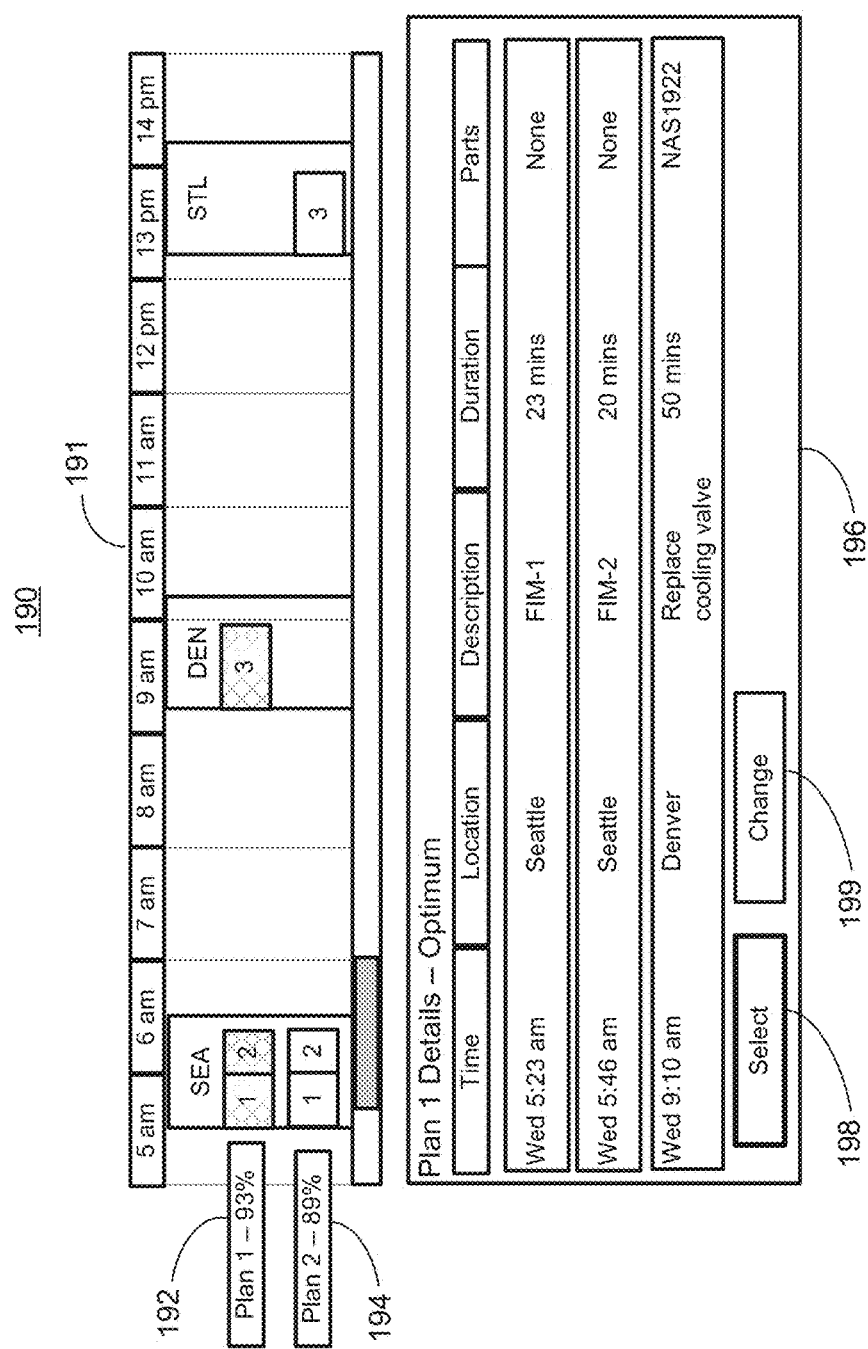
FIG. 4 is an exemplary illustration showing an output of the aircraft maintenance scheduling system.

An optimizing tool 132 synthesizes data from all available sources to provide one or more recommended courses of action for addressing a particular event. A preprocessor 134 receives data from the various sources and provides data transformation and normalization as required for a particular data type and its source. A management service 136 oversees processing and resource scheduling, and a plan optimizer 138 generates the one or more courses of action from the manufacturer data, the operator (e.g., airline) data, and other data such as weather information using rules that are applicable to a particular situation or event. In one embodiment, the rules are predetermined and are selected from a plurality of rules or rule sets. In another embodiment, individual rules in a rule set may be customized according to the particular situation or event, as will be discussed in more detail below. Execution of the rules results, in most cases, with a course of action to correct the problem. One embodiment for presenting the course of action is illustrated in FIG. 4 and discussed below.

The system 102, in the illustrated embodiment, also includes several exemplary support services connected via the data service bus 120. Data services 140 include access to storage and backup as well as archival processes. An auxiliary interface 141 connects to standard data services, such as weather agencies or commercial data services. Because such connections to such data services are generally public and well documented, the libraries of the service bridge 122 may not be necessary for ease of integration. However, in some embodiments, the capabilities provided by the auxiliary interface 141 may be incorporated into the service bridge 122.

Authentication and security services 142 provide login control and one-way and mutual authentication between both internal components as well as external services accessed via the service bridge 122. The authentication and security services 142 also, in an embodiment, provide file and/or communication encryption when desirable or required. In total, the architecture and interfaces are part of a digital aviation platform, known in an embodiment as a DAP. FIG. 3 illustrates an exemplary data flow 160 for processing an event. The management service 136 of the optimizing tool 132 sends requests, manages collection of data and schedules processing when the necessary data has been received. The preprocessor 134 is used when data needs to be reformatted or used to generate derivative information, for example, time zone conversions or conversions between part supplier numbering systems. The data that will eventually be used by the plan optimizer 138 comes from two primary sources and a number of secondary sources. A first primary source is the manufacturer 106 which provides manufacturer data 161. Or, in an alternate embodiment, the manufacturer data 161 may be sourced by a third party data provider that catalogs the manufacturer data 161.

The manufacturer data 161 provides, in different embodiments, some or all of the following:

Fault Isolation Manual (FIM)—The FIM provides a step-by-step process for determining the source of a fault or other event code. Associated with the FIM is the time required to perform each of the fault isolation steps. In some cases, a certain amount of disassembly of a portion of the aircraft may be required to perform some steps in a fault isolation process. The effect is that some steps may require more time than other steps.

Maintenance manuals—Maintenance manuals catalog both the required routine maintenance for an aircraft and also the disassembly and re-assembly steps required to access and/or replace a particular component or perform a routine maintenance task, such as checking a hydraulic system. Some, if not all, maintenance manuals may also include the expected time required to perform a particular maintenance step.

Minimum Equipment List—A reference used by a dispatcher to determine whether a particular event requires grounding the aircraft. The MEL is specific to a particular make and model of aircraft and specifies equipment related to airworthiness and operating regulations that may be inoperative and yet maintain an acceptable level of safety by appropriate conditions and limitations.

Airplane Health Management (AHM)—Aircraft maintenance management optimization. AHM is a service that uses real-time airplane data to provide enhanced fault forwarding troubleshooting, and historical fix information to reduce schedule interruptions, improve fault isolation, and increase maintenance efficiencies.

Weather alerts—In addition to weather service reports and conditions, weather information for various locations may be reported by the manufacturer.

Aircraft Technical Data—Information related to operational and mechanical specifications and tolerances for an aircraft. Because of the high level of customizations of aircraft some specifications may be detailed to an individual aircraft. For example, due to seat configuration and engine variations, specifications for weight and balance may vary on an aircraft-to-aircraft basis.

Deferred Maintenance Operational Risk Assessment (DMORA)—Also known as "deferred risk", this is an evaluation of the impact of an event on the operational readiness of an individual aircraft as well as a fleet of aircraft. It quantifies a risk level associated with deferring maintenance.

Delay Risk—This shows the relative risk a specific system failure might have on a flight schedule. It assesses the likelihood of specific aircraft system causing flight schedule delays, and then correlates that interruption probability with the magnitude of historical event average flight schedule delay length.

Fix effectiveness information—Fix effectiveness is based on past history of the repair process and uses text analysis of the maintenance records to determine what repair action fixed the fault. The application of fix effectiveness information is discussed more below.

The second primary source of information used in making decisions about maintenance situations is operator data 162. That is, data from an operator of the aircraft, such as an airline. The operator data 162 includes, in various embodiments and without limitation, the following:

Maintenance Management System—The operator's system for scheduling, tracking, and logging maintenance-related activities for aircraft of the operator's fleet.

Flight schedule—The flight schedule for the aircraft being considered. The route, arrival times and on-ground times for an aircraft are used by the optimizer 138 in determining where and when a maintenance activity will be scheduled.

Aircraft configuration—The specific configuration of the aircraft being considered, including, but not limited to, age, time since last service, seating configuration, engine type, hydraulic system, and winglet type.

Location capability—The capability of a particular location to perform specific levels of service, including, but not limited to, hangar capacity, tool and test equipment availability, and technician service certifications.

Parts inventory—The parts available by location corresponding to the event for the aircraft being considered. Ideally, every part will always be at every location. However, when an identified part is needed but not at the desired location, there are several ways to address the need. First, the aircraft can be moved to where the part is, particularly if the part is at a location on the aircraft's flight schedule. Second, the operator can move the part to the repair location on one of the operator's scheduled flights. Third, the part can be moved by one of the standard shipping services, such as UPS or Federal Express. The desirability of one method over another is dependent on the size or weight of the part, the time required to ship the part, the flight schedule, weather, etc. Part availability is handled by the system 102 in executing the rule set, along with other factors that are discussed more below.

General Practices Manual—A manual of standard operating procedures for a particular operator which may include such items as prioritization guidelines, preferred maintenance locations, etc.

Master Minimum Equipment List—a reference containing a superset of the manufacturer's Minimum Equipment List (MEL) and an operator's additional levels of safety and comfort required for an airplane to be operated.

Policies, operations, business and maintenance information—Additional relevant information on personnel, approval levels by expected cost, escalation procedures, etc., for a particular operator.

Figure 3:
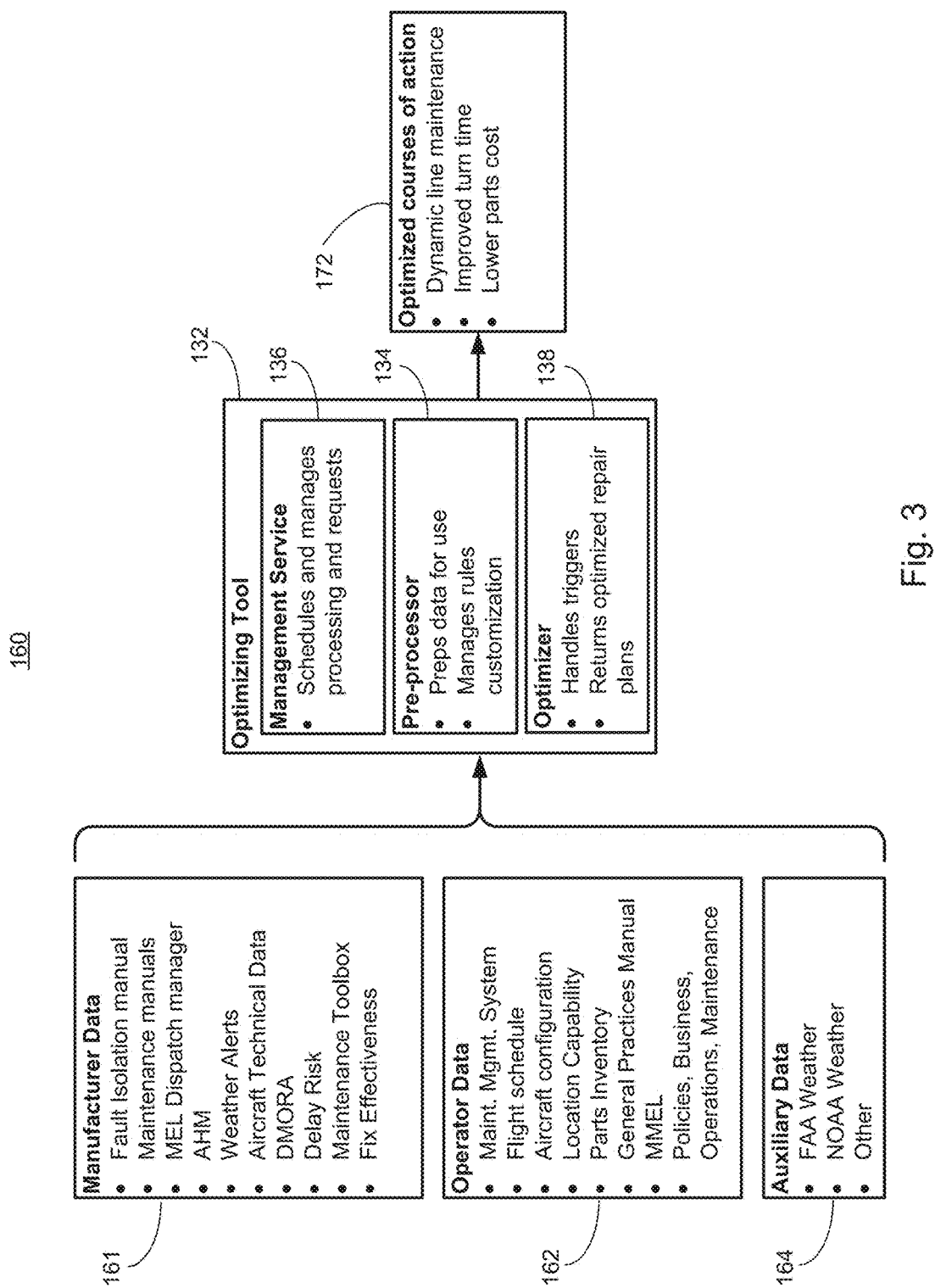
FIG. 3 illustrates data flow in the aircraft maintenance scheduling system.

Additional sources of information used by the optimizer 138 are illustrated in FIG. 3 as Auxiliary Data 164. Auxiliary data may include weather information from the Federal Aviation Administration (FAA) and the National Oceanographic and Atmospheric Administration (NOAA). Weather information is used by the optimizer for many purposes. In one example, the weather information may be used to predict whether an aircraft will be able to reach a possible maintenance destination, either on its flight route or as an unscheduled destination. In another example, weather information may be used to determine if an aircraft will be delayed at a location where maintenance activities can be carried out, given the expected extra ground time. Weather can also be used an indicator of whether maintenance might need to be performed inside a hangar, thus impacting the ability of a specific airport from conducting the repair. For example, a high wind condition may preclude a mechanic from working outdoors on a raised platform, and if the repair requires the removal of external panels it may not be advisable to perform the work outdoors due to water intrusion inside the aircraft structure resulting from rain.

When some or all of the relevant data is received at the optimizing tool 132, any data that needs reformatting, calculation or normalization is processed at the preprocessor 134. The preprocessor 134 may also manage rule customization, which is discussed in more detail below.

The management service 136 oversees scheduling requests and processing jobs. The plan optimizer 138 uses the rules to develop repair plans and presents them according to their efficacy based on the goals (weighting) of the rules.

The repair plans may then be used by either additional automated systems or dispatcher-based systems to provide dynamic line maintenance that achieves improved turn-around time on maintenance activities and lowers parts cost by reducing the number of parts that must be moved between repair facilities.

Fix Effectiveness/SAV Ratings

The discussion now turns to fix effectiveness that is mentioned above. Fix effectiveness information is developed by reviewing past reports of maintenance activities with a text analyzer to determine which part was the root cause of the fault. More specifically, statistics are kept, in one embodiment, for reported fixes that result in no recurrence of the problem for 10 days. For example, one particular pneumatic system code results in a 10 day (or greater) repair after a system reset is performed 75% of the time, by replacing filter 1 20% of the time, and by replacing filter 2 5% of the time. The fix effectiveness for replacing filter 1 is higher than the fix effectiveness of replacing filter 2, so in this case it can be assumed that roughly 95% of the time, the fault will be fixed in two repair actions or less, before filter 2 is replaced. In another example, the fourth FIM step of repairing a compressor may clear the fault 75% of the time. While it might be logical to move such a step to the beginning of the fault isolation process there may be other considerations driving that step's location. In such a case the fourth step might involve a component that is both expensive and time consuming to repair, so there is a value in performing the easier and less costly fault isolation steps earlier in the process even though they may be less effective.

Overall, the value in developing the fix effectiveness information is that it provides a method for predicting repair times on a statistically accurate basis. Even though individual cases may deviate, when taken fleet-wide the repair times and costs can be predicted and used to schedule maintenance personnel, ground facilities, and aircraft downtime.

The fix effectiveness may be captured by three statistics, a simplicity value, an ambiguity value, and a volatility value (SAV). The data for determining the SAV rating is based on an analysis of the text logs of resolved problem reports, which are generally free-form text entries made by repair technicians. Example calculations will follow the brief explanation of each.

Simplicity is a measure of how well the FIM is understood for a particular code or event. The value of simplicity is ternary ($-1$, $0$, $+1$). $+1$ is assigned when greater than 50% of the service reports are coded with a repair of "retest/checked OK." 0 is assigned when less than 50% of the error reports are coded as "checked OK" with one exception. The exception is that a $-1$ is assigned when greater than 50% of the error reports are coded as "other" or "unknown." The term 'coded' is used but, in practice, coded may simply mean that the error report includes the plain text of "checked OK," "other," or "unknown."

The ambiguity value is a measure of the percentage of total steps in a FIM that on average are needed to repair the fault. The value is captured in a formula that compares the highest fix effectivity percentage to the number of other possible steps in the FIM. The following equation is used to calculate the ambiguity value in one embodiment:

Highest Fix Effectivity %+(100/(1+((# of FIM steps−1)/10))))/2

The volatility value is a measure of the number of steps required to reach a certain percentage fix effectiveness. In an embodiment, the desired fix effectiveness is set to a preselected confidence level of 90%. That is, how many steps of the FIM are needed to reach a cumulative fix effectiveness of 90%. A best case (BC) value is calculated as the number of steps counted from the beginning needed to reach the given fix effectiveness. A worst case (WC) value is the number of steps counted from the last step of the FIM needed to reach the given fix effectiveness. The volatility value is given by the formula:

((BC+WC)/2)−1

While determining the simplicity value is straightforward given a set of maintenance reports, several examples follow that illustrate the calculation of ambiguity and volatility.

EXAMPLE 1

A One Step FIM with a 100% Effectiveness: {100%}

Ambiguity=(100+(100/(1+(0/10))))/2=(100+100)/2=100, absolute certainty

Volatility=((1+1)/2)−1=2/2−1=0, zero volatility

EXAMPLE 2

A Two Step FIM with Values: {90%, 10%}

Ambiguity=(90+(100/(1+(1/10))))/2=(90+91)/2=90.5, high certainty

Volatility=((1+2)/2)−1=3/2−1=0.5, slight volatility

EXAMPLE 3

A Four Step FIM with Values: {50%, 30%, 15%, 5%}

Ambiguity=(50+(100/(1+(3/10))))/2=(50+77)/2=63.5, moderate certainty

Volatility=((3+4)/2)−1=7/2−1=6 increasing volatility (BC requires three steps from the left to reach 90% certainty, WC requires four steps from the right to reach 90% certainty, which in this case is also 100% certainty.)

EXAMPLE 4

A 100 Step FIM with Each Step Having a 1% Fix Effectiveness: {1%, 1%, 1%, . . . }

Ambiguity=(1+(100/(1+(99/10))))/2=(1+9.2)/2=5, low certainty

Volatility=((90+90)/2)−1=180/2−1=89, high volatility (BC and WC are identical since the 90% confidence is reached both 90 steps from the beginning and 90 steps from the end.)

Obviously, some of the examples are extreme for the purpose of illustration, but as can be seen, more steps in a FIM generally increases the values of both ambiguity and volatility. Similarly, steps with an overall lower effectiveness also increase the ambiguity value and the volatility value. The equations are empirically derived and are selected to use variables that are easily obtained by data mining maintenance reports. The equations are also selected to create a noticeable distance between values based on the more highly valued characteristics of fewer FIM steps and better resolution near the beginning of the process. Because of this, these equations are merely examples and other suitable equations could be developed and substituted, notwithstanding possibly significant effort, when guided by the concepts and principles disclosed herein.

As will be illustrated below with respect to FIGS. 6-7, the calculated values for SAV (simplicity, ambiguity, volatility) are simply another set of inputs into the rules engine for performing the optimization process resulting in a maintenance plan. In other embodiments, the SAV values can be used independently of the system 102.

FIG. 4 depicts a screen shot 190 of an exemplary display of results produced by the optimizing tool 132. A calendar portion 191 shows alternatives for a work order that involves three stages. The Plan 1 summary line 192 shows that Plan 1 is 93% compliant with the rule set and illustrates that steps 1 and 2 would be carried out in Seattle between 5:30 am and 6:30 am. The aircraft would then be flown to Denver where the remaining step 3 would be begun shortly after 9:00 am. The Plan 2 summary line 194 shows that Plan 2 is 89% compliant with the rule set. In Plan 2, steps 1 and 2 are also completed in Seattle but step 3 is completed in Saint Louis at about 1:15 pm.

The detail section 196, in this exemplary embodiment, shows details for the highest rated plan which is therefore the default Plan 1. The time, location, description, duration, and parts columns are self-explanatory, showing the expected time for each repair and the parts required, if any. The 'select' button 198 allows a dispatcher 114 to activate Plan 1, which will cause work orders to be issued in Seattle and Denver and for the needed technicians and parts to be allocated for the work. The 'change' button 199 allows, in another window, selection of Plan 2, selection of another lower rated plan, or changing the rules to optimize around other criteria relative to the maintenance service.

Figure 5:
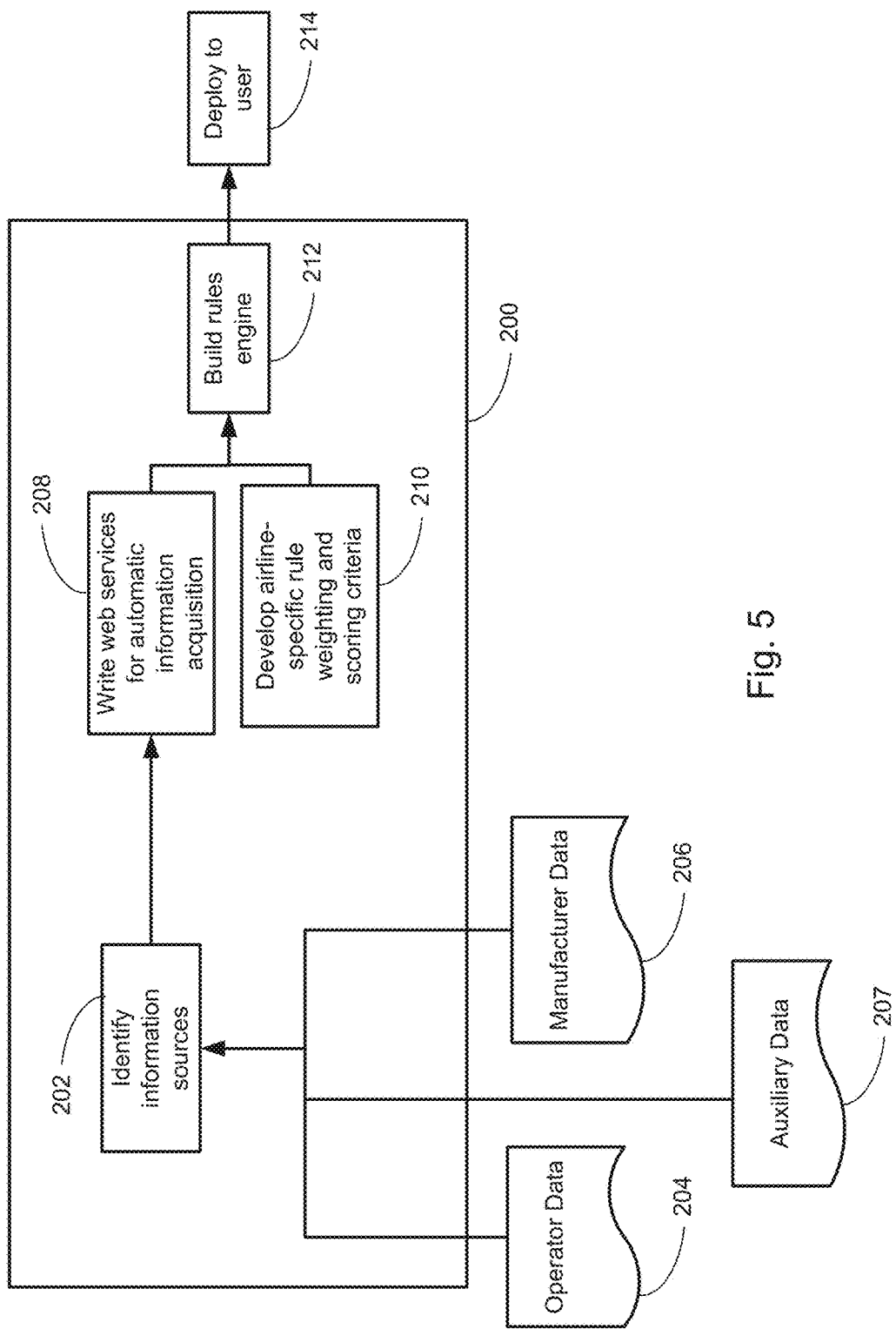
FIG. 5 is an illustration of steps for setting up the aircraft maintenance scheduling system.

FIG. 5 illustrates one embodiment of an administrative tool 200 for setting up and administering the system 102. At block 202, the information needed for decision making are determined and correspondingly, the sources of that information are determined. As shown in FIG. 5, information source 204, typically an operator, includes information discussed above, such as flight schedules. Information source 206, typically a manufacturer, provides those information elements discussed above with respect to FIG. 2 and include Fault Isolation Manuals (FIM) and risk assessments. Auxiliary data 207 may include weather information or other data received via additional third parties.

At block 208, interfaces to the identified data sources are developed and implemented. These interfaces may be embodied in the service bridge 122 (FIG. 2). In an embodiment, a library of interfaces may be used to facilitate development of the individual interfaces, including libraries for different database vendors and communication protocols.

For each client, for example, a particular airline, specific rule change policies, rule weighting, and scoring are developed at block 210. Rule weighting and scoring are a function of the particular carrier. A carrier that primarily (or exclusively) flies internationally, may place a higher value on returning to their main hub in order to limit the exposure to high shipping costs and potential customs issues for repair parts shipped to a foreign country. A carrier that operates in a harsher climate, such as an airline based in Canada may place a higher weight on weather in planning than a carrier that operates primarily in a milder climate such as an airline based in Mexico.

A rule change policy sets limits on which rules can be modified and/or what limits can be made to their weighting. Some carriers may want dispatchers or others who interact with the system 102 to have more discretion about changing rules so that the system 102 will develop more or different options for recommending repairs. Dynamic rule change is discussed in more detail below.

The rules engine is built at block 212. In an embodiment, the rules engine is a commercial off-the-shelf (COTS) product but in other embodiments, the rules engine may be internally developed or modified from an off-the-shelf product. After the rules engine is configured and tested, the system 102 may be released to a user at block 214. The user is typically an airline or other air carrier such as a shipping company. In other embodiments, the user may be a fleet of charter aircraft or even federal agency that manages a fleet of aircraft.

Figure 6:
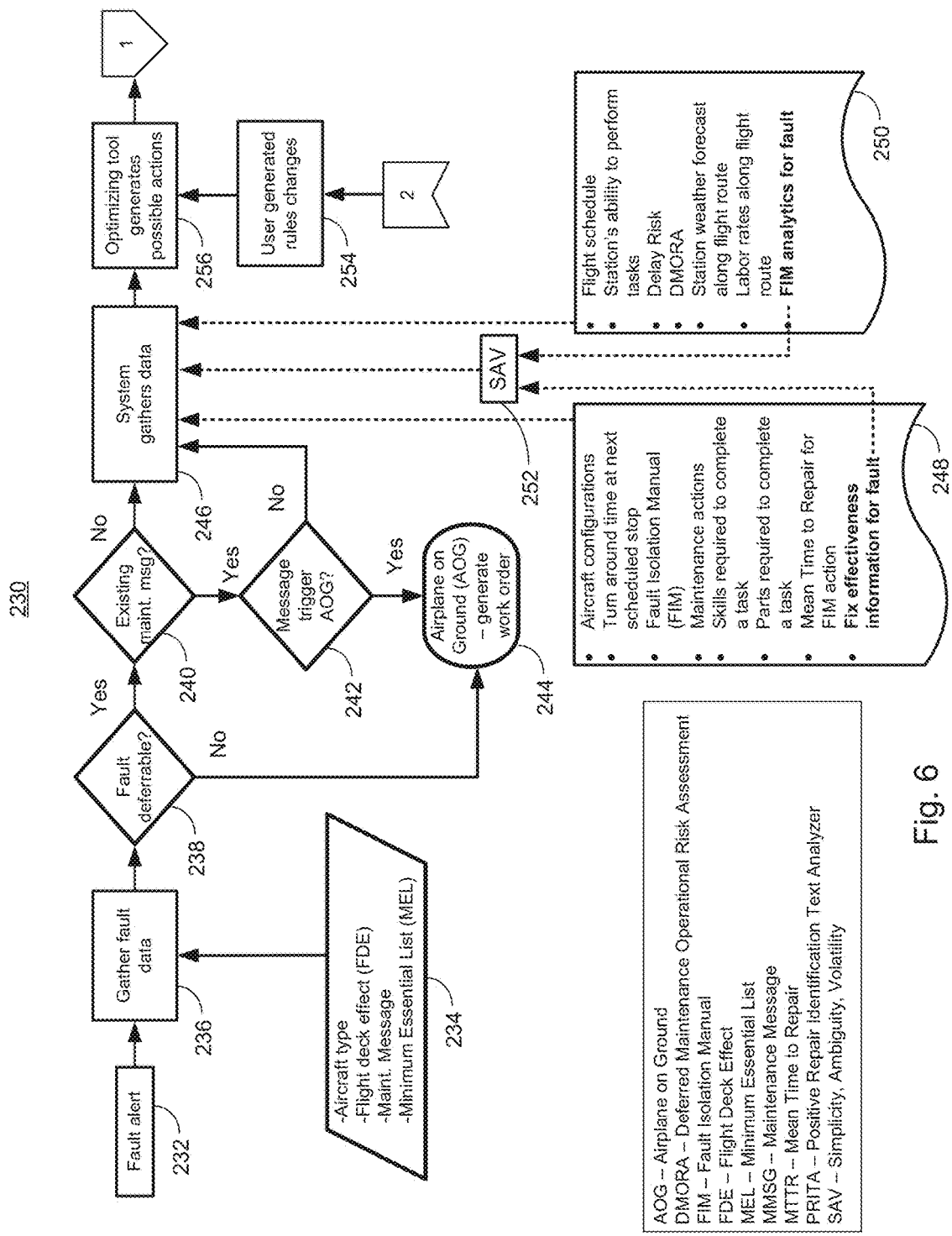
FIG. 6 is a flow chart of steps associated with use of the aircraft maintenance scheduling system.
Figure 7:
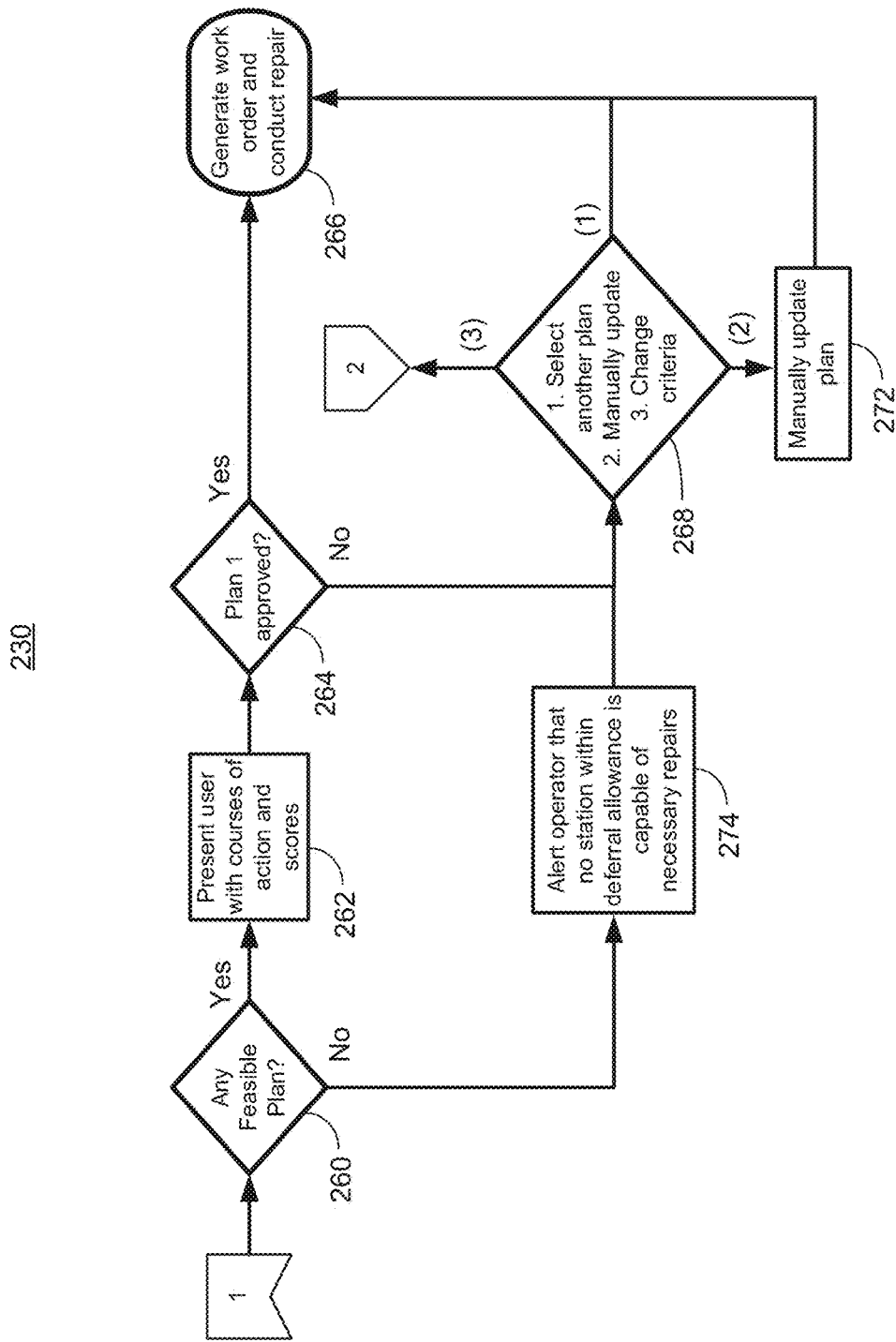
FIG. 7 is a continuation of the flow chart of FIG. 6.

FIG. 6 and FIG. 7 are a flow chart 230 of steps performed in operating a system 102 used for aircraft maintenance scheduling. At block 232, an alert related to a fault or error report is received at the system 102 related to an aircraft 104. The event, fault, or error report may be received directly from the aircraft data system, from a report received from flight personnel or ground maintenance personnel or other source. The event, fault, or error report may also be generated by an aircraft maintenance scheduling system that maintains a log of upcoming routine maintenance requirements. The data related to the fault is gathered at block 236 including information from block 234. In an embodiment, the data is aircraft type, flight deck effect, a maintenance message and an associated minimum equipment list (MEL). Flight deck effect is the message displayed to a flight crew that helps the crew determine a response to the current condition, rather than necessarily what component in a system has failed. The MEL is specific to a particular make and model of aircraft and specifies equipment that can be inoperative that does not prohibit operation.

At block 238, a determination is made if the fault is deferrable. Perhaps obviously, if the determination is 'no,' that the fault is not deferrable execution continues at block 244, the aircraft is grounded and a work order is generated that initiates the repair. When at block 238 the fault is deferrable, execution continues at block 240 where a check is made to determine if there is an existing maintenance order for the aircraft. If yes, execution continues at block 242 to determine if this additional fault, in combination with the most recently identified fault, creates a situation where the fault is no longer deferrable. For example, the new fault may reduce the aircraft's functional systems below the acceptable MEL requirement. When this occurs, execution continues at block 244, which, as before causes the aircraft to be grounded and a work order is generated.

Returning to block 240, when there are no other pending maintenance conditions, execution continues at block 246. This is also true if at block 242 the additional maintenance condition does not create an Aircraft on Ground (AOG) condition.

The system 102, at block 246 gathers data beyond the fault condition information collected at block 236. As discussed above with respect to FIG. 3, the data collected at block 246 includes, generally, equipment-related data 248, such as the FIM, and environment-related data 250, including flight schedule, parts availability, and weather. Also as discussed above, the SAV data 252 is calculated and included in the data collected at block 246 using, among other things, information from data 248 and data 250.

The optimizing tool 132 is activated at block 256. The optimizing tool 132 attempts to generate at least one course of action for addressing the condition or fault experienced by the aircraft 104. In some cases, no course of action may found that meets all the requirements of a rule set. In other cases, one or more courses of action are developed and made available.

Continuing at the "1" marker in FIG. 7, the flow chart continues at block 260 where a determination is made if there are any plans which satisfy the minimum requirements of the rules. If so, execution continues at block 262 and one or more courses of action are presented. One example of the display of the results is illustrated in FIG. 4 and discussed above. If the top rated plan is acceptable, that plan may be approved at block 264 and the 'yes' branch followed to block 266, where a work order is generated and the repair of the aircraft 104 is performed according to the plan. Execution of the plan may require the aircraft 104, parts, or both to be moved to the location indicated in the plan.

If, at block 264, the highest rated plan is not selected, execution may follow the 'no' branch from block 264 to block 268 where another plan may be selected following option (1) to block 266. Alternatively, at block 268, all proposed plans may be rejected and a manual update to any of the plans may be made by following option (2) to block 272.

A third option available at block 268 is option (3) which returns to block 254 of FIG. 6 and allows a user to update the rules for the particular event or fault being considered. When the rule changes are completed, execution by the optimizing tool 132 at block 256. Notably, the rule changes made at block 254 are temporary changes to the rules and apply only to the aircraft 104 for the fault or event currently under consideration. The general rule set remains intact and another concurrent use of the process 230 will use the unmodified rules.

Returning briefly to block 260, if no feasible plans are generated by the optimizing tool 132, execution may follow the 'no' branch to block 274 where the operator may be alerted to lack of automatically generated options. Execution may continue at block 268 where only options 2 and 3 are presented (option 1 being associated with selecting another plan, which does not exist in this case)

FIG. 8 is an illustration depicting one possible user interface 300 suitable for use at block 254 of FIG. 6 for modifying rules. A rule set 302 is shown with a plurality of individual rules 303-310. In this exemplary embodiment, each rule is presented in plain text, as opposed to a computer programming language and individual rules may be selected or deselected using a checkbox. Deselected rules may be grayed out for easier identification of active rules. Some rules, such as shown with rules 303 and 304 may have user-settable values, in this case minutes of turn time for fault isolation and repair tasks, respectively. Each rule is given a value for soft or hard execution. Soft rules are considered as desirable but not required, in other words a programmatic "may." Hard rules are considered as required or programmatically "shall." As illustrated, 'hard' or 'soft' are deselected with the value zero. The weight of a rule is changed by increasing its respective 'hard' or 'soft' value, as illustrated in this embodiment in a range of −1 to −3. The ability of an operator to selectively turn off rules or to change rule execution from hard (required) to soft (desirable) and their weight is a capability that greatly expands the usefulness of the optimizing tool 132. Such real-time and non-permanent changes to the rule set gives the operator discretion to accommodate special circumstances or to apply information that, in an instance, is available to the operator but not easily updated in the data sets 248 and 250. For example, an operator may have a very current weather update that has not been reflected in the weather information captured at the data set 250 (FIG. 6) so that the operator can turn off a weather-related rule in order to increase the alternatives for repair locations and times. Certainly other examples of reasons for rule changes are expected, including, but not limited to, current news events, operator personal experience, personnel schedules, etc.

It is expected that changes made to rules can be logged and reviewed, either manually or automatically, so that over time the base rules can be updated to reflect changes that appear routinely or in selected situations. In this manner, the base rules become more sophisticated and the overall system 102 becomes self-learning.

As shown in FIG. 8, some rules are related to the tasks themselves, such as rule 309 that states that when multiple tasks are required, they must be completed in order. Some rules relate to parts availability, such as rule 305 which states that required part number in the FIM is not known to the parts database. This means that while the FIM may call for a particular part number, equivalent parts with different numbers, for example, from another vendor, may be used. Some rules relate to the facility where the service is performed, such as rule 310 that specifies a level of certification of the repair facility. Other rules may specify sensitivity to weather forecasts and other rules can set sensitivity to SAV values.

As discussed above, the rules may be turned off or on, or have their 'hard' or 'soft' values changed within the limits of the policy descriptions specified when the system is configured (block 210, FIG. 5). In this way, the airline can place limits on how much discretion operators of the system 102 can customize rules. In an embodiment, the policies themselves may be specified in the form of rules so that the policies can be modified, by an appropriately authorized person, for particular situations, such as a multi-state blizzard or hurricane.

Figure 9:
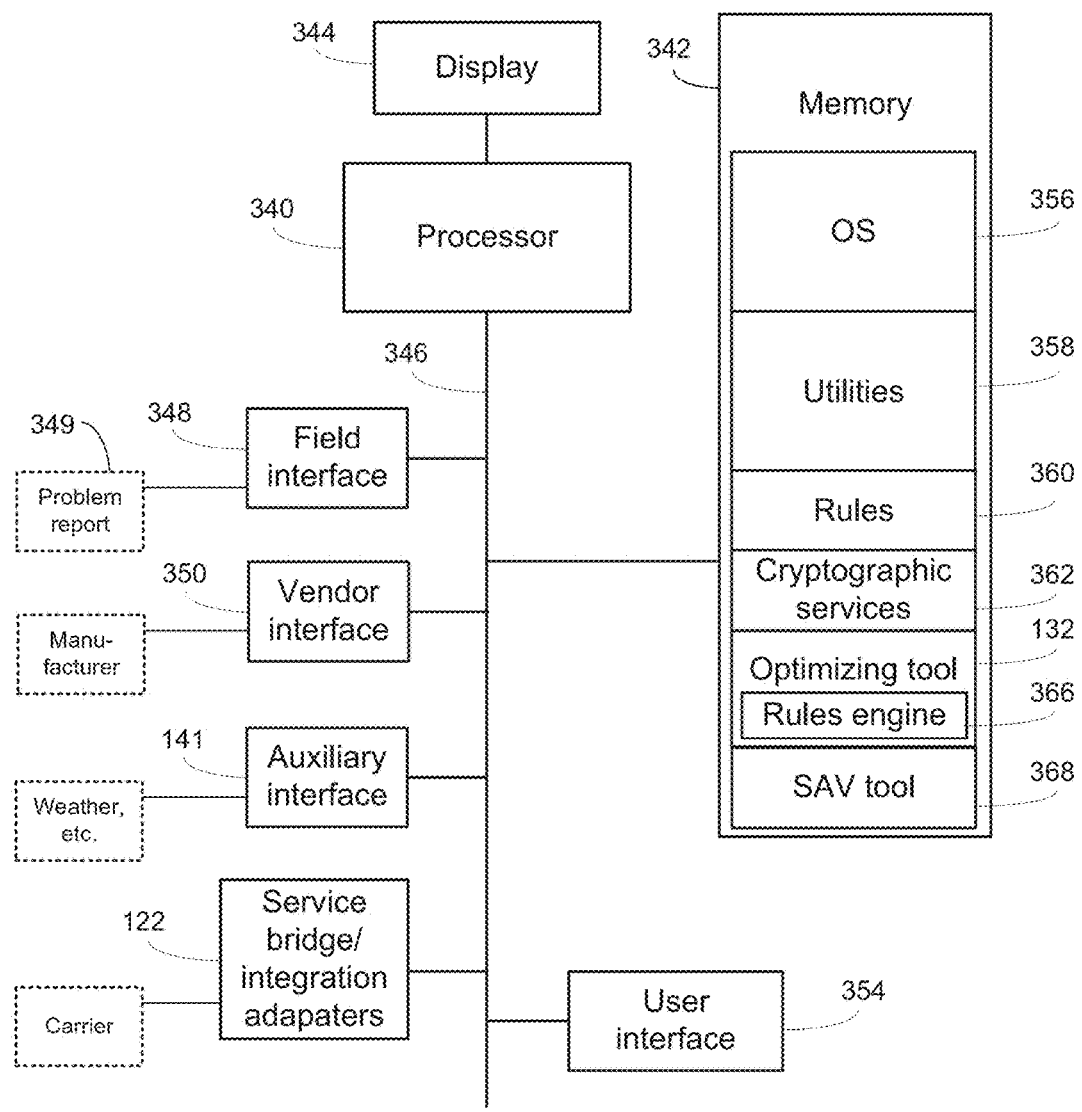
FIG. 9 is a functional block diagram of the aircraft maintenance scheduling system.

FIG. 9 illustrates a functional view of the system 102, contrasting the services architecture view illustrated in FIG. 2. The system 102 includes a processor 340 connected to a memory 342 and a display 344 via a data bus 346. The data bus 346 also connects the processor 340 to a number of interfaces, including, but not limited to, a field interface 348, a vendor interface 350, an auxiliary interface 141, a service bridge 122, and a user interface 354.

The field interface 348 is connects to various reporting entities and is used to receive problem reports about a particular aircraft 104 from an electronic non-conformance repository 349. In an embodiment, the non-conformance repository 349 is an automated reporting system such as ACARS, but may also include various flight crew and ground crew reporting systems. As illustrated in FIG. 6, the receipt of a problem report is the initial trigger for activation of the system 102. The vendor interface 350 connects the system 102 with manufacturer data for the aircraft 104, both by general model and by specific tail number (individual aircraft). Such information includes, but is not limited to, the FIM and the MEL for that aircraft. In an embodiment, this information is from the manufacturer of the aircraft 104 but in other embodiments may be available from another data aggregator.

The auxiliary interface 141 is used to connect to services that provide, for example, weather data for various locations. Specifically, the system 102 uses weather forecasts for destinations on the route of the aircraft 104 to determine if a possible repair location will be accessible in the desired time frame. The service bridge 122, discussed above, provides a set of libraries that can be used for connecting to an airline or other carrier to receive, in response to a query from the system 102, information about flight routes, service locations, and parts inventories. The user interface 354 in conjunction with the display 344, is used to provide information to an operator and receive instructions from the operator. The information includes, in an embodiment, one or more courses of action, as illustrated in FIG. 4. The instructions may include changes to rules including enabling or disabling rules as well as changing the weight of rules, discussed above with respect to FIG. 8.

The service bridge 122, discussed above, connects the system 102 to the airline or carrier databases which include among other items, policy information, parts inventory, and route information for the aircraft 104.

The memory 342 is a physical memory and does not include carrier waves or propagated media. The memory 342 includes, in various embodiments, an operating system 356 and utilities 358. The operating system 356 and utilities 358 are used to manage the overall operation of system 102 and for set up and diagnostics. The rules 360 may include individual rules 303-310 shown above with respect to FIG. 8. These rules 360 may be in rule sets 302. Additional rule sets (not depicted) may be stored for use with different users (e.g. different carriers) of the system 102 or for different circumstances by the same user. The memory 342 may also include cryptographic services 362 used by the authentication and security services 142 (FIG. 2). In other embodiments, cryptograph services may be provided by a hardware unit such as a smart chip (not depicted). The memory 342 may also include an optimizing tool 132, discussed above. The optimizing tool 132, in an embodiment, includes a rules engine 366 that executes on the processor 340 to process the rules 360. The memory 342 may also include a SAV tool 368. As discussed above, the SAV tool 368 collects information mined from service reports and generates, in one embodiment, three values used by the rules engine in generating courses of action for addressing the reported problem in the aircraft 104.

The ability to aggregate data from multiple sources, generate and evaluate alternative repair plans, and rapidly re-evaluate those plans using a customized rule set is a significant improvement over prior art systems that are rigidly defined and have limited access to data. Further, the use of simplicity, ambiguity, and volatility (SAV) in the assessment of possible courses of actions recognizes the value of historical data related to analysis and repair of the same problem report. The SAV information provides the system 102, or a manual dispatcher with a window into the complexity, and therefore the time that resolving an issue is likely to take. The system 102 does not merely automate a process that is already performed manually, but because the system 102, compared to prior art systems, has access to not only additional data but to configurable rules, the system 102 improves both the speed and accuracy of maintenance plan generation. This results in aircraft spending more time the air and less time on the ground, which is the fundamental driver in the air transport industry.

While only certain embodiments have been set forth, alternatives and modifications will be apparent from the above description to those skilled in the art. In particular, aspects of the different embodiments can be combined with or substituted by one another. These and other alternatives are considered equivalents and within the spirit and scope of this disclosure and the appended claims.

What is claimed:

1. A system that allocates resources to repairing a non-conformance condition in an aircraft, the system comprising:
a processor and memory coupled to a service bus that receives and distributes data related to the non-conformance condition;
the service bus further configured to retrieve deferred risk data and technical data for the aircraft;
a service bridge configured to receive operator data from an operator of the aircraft, the operator data including route plans and an inventory of parts;
an optimizing tool coupled to the service bus, the optimizing tool including:
a pre-processor that formats the data received via the service bus;
a plan optimizer that generates repair alternatives to repair the non-conformance condition based at least in part on the deferred risk data, the technical data, and the operator data using a rule set, wherein the rule set is configured to be customized during operation of the optimizing tool; and
a management service configured to cause generation of a work order to allocate resources associated with a selected one of the repair alternatives; and
a simplicity, ambiguity, volatility (SAV) tool coupled to the service bus, the SAV tool receiving historical data for the non-conformance condition and providing a SAV rating for use by the plan optimizer in generating the repair alternatives.

2. The system of claim 1, further comprising an authentication and security service coupled to the service bus that provides data encryption and authentication services for communications via the service bridge.

3. The system of claim 1, further comprising an administrative tool that provides for generation of the rule set and for setting the service bridge for communication with the operator to receive the operator data.

4. The system of claim 1, further comprising a user interface that receives instructions to implement a change to the rule set, wherein the change is specific to the non-conformance condition in the aircraft.

5. The system of claim 4, wherein the user interface receives instructions to deactivate an individual rule from the rule set.

6. The system of claim 5, wherein the user interface receives instructions to change a rule weight of an individual rule in the rule set.

7. The system of claim 1, wherein the SAV rating includes a simplicity value having ternary value of +1, 0, or −1, the +1 assigned when a diagnosis for a non-conformance condition of "checked okay" exceeds a threshold value, the 0 assigned when the diagnosis for the non-conformance condition of "checked okay" does not meet the threshold value, and the −1 is assigned when a number of indeterminate diagnoses exceeds a second threshold value.

8. The system of claim 7, wherein the SAV rating includes an ambiguity value that is a function of a percentage an average number of repair steps to a total possible number of repair steps required to resolve the non-conformance condition.

9. The system of claim 8, wherein the SAV rating includes a volatility value that is a combination of a best case number of steps to resolve the non-conformance condition to a pre-selected confidence level and a worst case number of steps to resolve the non-conformance condition to the pre-selected confidence level.

10. A method of determining a maintenance response to a non-conformance condition in an aircraft, the method comprising:
    receiving, at a processor with a memory, the non-conformance condition in the aircraft;
    receiving, at the processor and the memory, fault and maintenance information including a risk of further failure corresponding to the non-conformance condition specific to the aircraft;
    receiving from an operator of the aircraft, at the processor and the memory, a flight schedule for the aircraft, one or more repair locations, and an inventory of parts relevant to the non-conformance condition;
    generating a simplicity, ambiguity, volatility (SAV) rating for the non-conformance condition by comparing historical repair records for the non-conformance condition to a repair process for the non-conformance condition, wherein the SAV rating contains a simplicity value, an ambiguity value, and a volatility value for resolving the non-conformance condition;
    evaluating, using a rule set stored in the memory executed on the processor, the fault and maintenance information, the risk of further failure, the flight schedule for the aircraft, the one or more repair locations and the SAV rating for the non-conformance condition to produce a location and time for the aircraft to have the non-conformance condition resolved; and
    generating a work order to repair the non-conformance condition in the aircraft at the produced location and time.

11. The method of claim 10, wherein using the rule set stored in the memory executed on the processor comprises using rules stored in the memory that, prior to use, are modified by selectively deactivating one or more rules of the rule set.

12. The method of claim 10, wherein using the rule set stored in the memory executed on the processor comprises using rules stored in the memory that, prior to use, are modified by selectively re-weighting one or more rules of the rule set.

13. The method of claim 10, wherein the volatility value of the SAV rating is calculated as $((BC+WC)/2)-1$, where BC is a best case number of steps required to resolve the non-conformance condition to a pre-selected confidence level and WC is a worst case number of steps required to resolve the non-conformance condition to the pre-selected confidence level.

14. The method of claim 10, wherein the ambiguity value of the SAV rating is calculated as $(HFE\%+(100/(1+(\# \text{ of other steps}/10))))/2$, where HFE is a highest fix effectivity in percent and "# of other steps" is a total number of steps in a resolution process less one.

15. A system for aircraft maintenance scheduling comprising:
    a processor with a memory that receives an error report from an electronic non-conformance repository in communication with the processor, the error report containing information for a non-conformance condition in an aircraft;
    a service bridge coupled to the processor with the memory and configured to receive from an operator of the aircraft: a flight schedule for the aircraft, one or more repair locations and their respective repair capabilities, and an inventory of parts for each of the one or more repair locations;
    a simplicity, ambiguity, volatility (SAV) tool coupled to the service bridge, the SAV tool receiving historical data for the non-conformance condition and providing a SAV rating for use in generating a repair alternative; and
    a rule set stored in the memory including a plurality of individual rules for processing the non-conformance condition, the flight schedule, the SAV rating, the one or more repair locations and their respective repair capabilities, and the inventory of parts, wherein the processor is configured to execute the rule set to:
        (i) determine whether correcting the non-conformance condition can be deferred, and
        ii) responsive to determining that the non-conformance condition can be deferred, selecting a location on the flight schedule and scheduling parts and personnel at the selected location for correcting the non-conformance condition.

16. The system of claim 15, further comprising a user interface that receives instructions to activate and deactivate one or more of the plurality of individual rules in the rule set to create a revised rule set for execution by the processor.

17. The system of claim 15, further comprising a user interface that receives instructions to reweight an individual rule in the rule set to create a revised rule set for execution by the processor.

18. The system of claim 15, further comprising a user interface that receives instructions to reject the selected location for correcting the non-conformance condition wherein the processor generates another location for correcting the non-conformance condition.

19. The system of claim 15, further comprising an integration adapter that has predetermined protocols for building interfaces to pre-existing data sources accessible via the service bridge.

20. The system of claim 1, wherein an ambiguity value of the SAV rating is calculated as $(HFE\%+(100/(1+(\# \text{ of other steps}/10))))/2$, where HFE is a highest fix effectivity in percent and "# of other steps" is a total number of steps in a resolution process less one.

* * * * *